(No Model.)
F. M. THORN.
POTATO DIGGING MACHINE.
No. 366,044. Patented July 5, 1887.
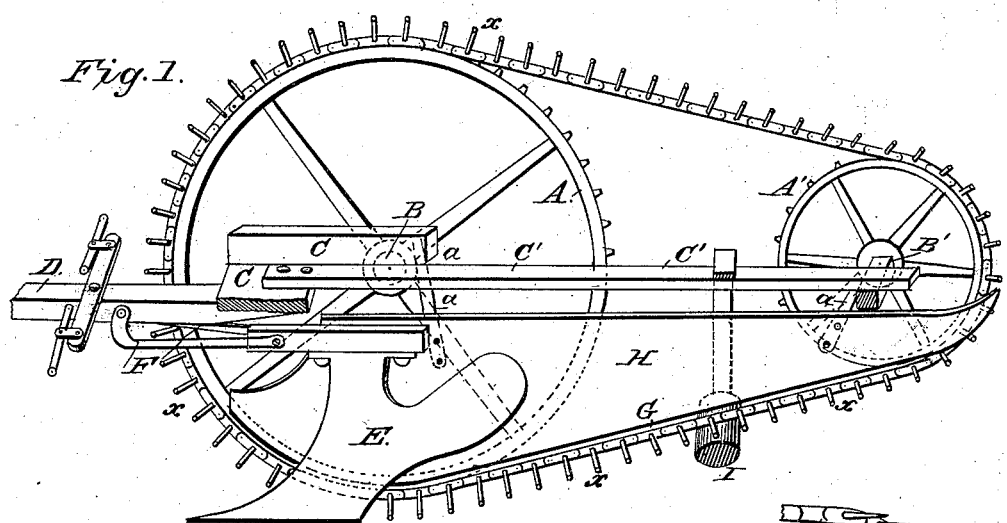
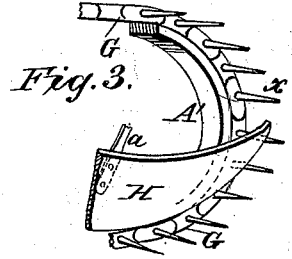
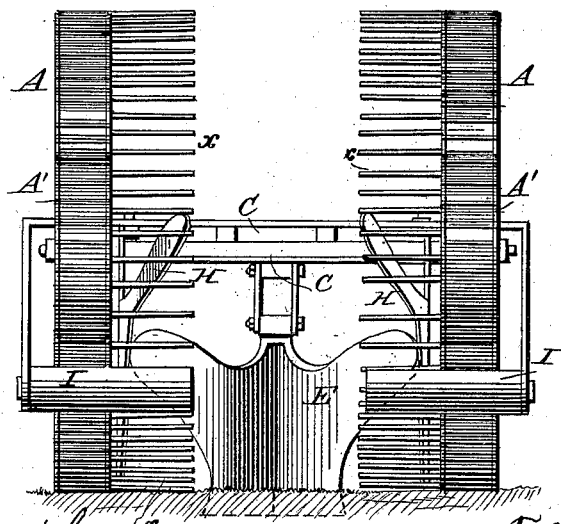
WITNESSES: Fred G. Dieterich, Amos W. Hart
INVENTOR: F. M. Thorn
BY Munn & Co.
ATTORNEYS.

UNITED STATES PATENT OFFICE.

FRANK M. THORN, OF ORCHARD PARK, NEW YORK.

POTATO-DIGGING MACHINE.

SPECIFICATION forming part of Letters Patent No. 366,044, dated July 5, 1887.

Application filed October 12, 1886. Serial No. 216,031. (No model.)

*To all whom it may concern:*

Be it known that I, FRANK M. THORN, of Orchard Park, in the county of Erie and State of New York, have invented a new and useful Improvement in Potato-Digging Machines, of which the following is a specification.

My invention is an improvement in the class of potato-diggers that are drawn by horse or other power, and it is more particularly an improvement upon the machine for which I have received Letters Patent of the United States No. 327,357. As stated, substantially, in said patent, the chief objection to the diggers of this class has been their inability to elevate the potatoes from the hills or rows to a sufficient height to render feasible their thorough sifting and separation from the adhering soil. The present invention is designed and adapted to accomplish this result in a very satisfactory manner. As before, I employ a double-mold-board plow to open a furrow through the rows of potatoes; but, in place of attaching to the peripheries of the transporting or bearing wheels the rods or fingers by which the potatoes are raised and sifted and separated from the soil, the said fingers are made fast to endless chains that run on said wheels, and also on smaller wheels or pulleys arranged in rear thereof. There being two chains—one for each bearing-wheel—and they being arranged parallel, the sifting-fingers project inward in a horizontal plane, or nearly so, toward the plow and toward each other.

The details of construction, arrangement, and operation of parts are as hereinafter described.

In accompanying drawings, Figure 1 is a perspective view of the machine in longitudinal section. Fig. 2 is a rear elevation. Fig. 3 is a perspective detail view.

The arrangement and means of connection of the transporting or bearing wheels A A, the axle B, the frame C, tongue D, double-mold-board plow E, and draft-rods F are substantially as described and shown in my aforesaid patent, and require no detailed description. The frame C is in this case supplemented by parallel bars C' C', which are bolted to it and extend rearward parallel, their rear ends being bolted to the shaft B', on whose journals are mounted the chain-pulleys A' A', which are arranged directly in rear of the wheels A A, and made preferably of about half their diameter. The peripheries of the wheels A A and pulleys A' A' are constructed in such a manner as to hold or lock with the links of the endless chains G G, that are mounted and run on them, as shown—that is to say, the said wheels and pulleys A' may have lugs adapted to enter the links of the chains, as shown; but I do not restrict myself to this particular means of connection between these parts, since it is obvious various others may be devised by the exercise of ordinary mechanical judgment and skill. The fingers X are rigidly secured to the links of the chains G, so that in practice they are from one to two inches apart. The mode of attaching them to said links may be varied. One method is to provide a link with perforated lugs, in which the fingers are inserted. The bearing-wheels A A run along each side of the potato hills or row, and as the machine advances each mold-board of the the double plow E turns half the contents of the potato row onto the adjacent system or series of sifting rods or fingers X on that side, by which (through the connection of the rods with the endless chains G) such contents are conveyed back and elevated until the combined shield and carrier H (which has thus far prevented their falling into the wheel-spokes) now pushes or carries them off the inner or free ends of the rods or fingers X and permits them to drop upon an additional separator, or upon the ground back of the plow and between the smaller rear wheels or pulleys, A'. The loose materials, while being thus conveyed back and elevated by the sifting rods or fingers X from a point opposite the mold-board to a point behind the axle of the pulley A', are more or less thoroughly sifted before being finally pushed off the rods by the shield and carrier H. The shield is attached to the frame C and rear axle, B', by inflexible bars or rods *a*, and extends nearly to the sifting rods or fingers X, and its lower edge extends close to and parallel with the endless chain G from a point nearly opposite the plow-point to a point directly under the axle of the rear wheels, A', and thence extends diagonally or spirally upward to the free ends of the sifting rods or fingers, as shown in Fig.

2. The bars or reachers C' may be adjustable relative to the frame of the machine, so as to permit the raising or lowering of the rear wheels, and also so as to give less or more tension to the endless chains. Between the front and rear wheels, on each side, a roller, I, is suspended, and may be so adjusted to each chain and system of sifting rods or fingers X as to prevent the twisting of that part of each system of chain and rods upon which the potatoes, soil, &c., are turned, and the consequent premature dumping of such potatoes, soil, &c.

In the drawings the driver's seat and the device for raising and lowering the plow are omitted, so as to simplify the illustration of my invention.

What I claim is—

1. In a potato-digger of the type hereinbefore indicated, the combination, with the plow and transporting-wheels, and pulleys arranged in rear of the latter, of the endless chains, carrying fingers or rods that project inward toward said plow, substantially as shown and described, whereby the mingled soil and potatoes turned onto the rods or fingers are carried backward and upward and separated, as specified.

2. In combination with the endless chain and system of sifting rods or fingers the combined shield and carrier, constructed substantially as described and adapted to prevent potato-tops or other materials from falling into the wheel-spokes or otherwise clogging, and to remove the potatoes, soil, or other materials from the sifting rods or fingers at any desired height from the ground, as specified.

3. The combination of the endless chains with systems of sifting rods or fingers with the combined shield and carrier, arranged as specified, and the double plow having its mold-board curved spirally, substantially as shown and described; whereby the soil and potatoes removed by the plow are not only turned laterally upon the sifting rods or fingers, but also inverted, so that the center of the row, which contains most of the potatoes, is thrown toward the outside of the systems of rods and next to the shield and carrier, leaving most of the soil nearer the inner or free ends of the sifting-rods, so that it will be first pushed off by the carrier, as specified.

FRANK M. THORN.

Witnesses:
SOLON C. KEMON,
CHAS. A. PETTIT.